United States Patent [19]
Rulon et al.

[11] Patent Number: 5,213,347
[45] Date of Patent: May 25, 1993

[54] SOCKET DRIVEABLE TAP APPARATUS

[75] Inventors: Richard E. Rulon, Avon, Conn.; Joel A. Negus, Clarinda, Iowa

[73] Assignee: Lisle Corporation, Clarinda, Iowa

[21] Appl. No.: 693,445

[22] Filed: Apr. 29, 1991

[51] Int. Cl.$^5$ .................................................. B23B 31/117
[52] U.S. Cl. ................................. 279/102; 81/124.4; 81/177.85; 279/145; 408/239 A
[58] Field of Search ............... 279/1 A, 76, 102, 1 R, 279/16, 43.1, 46.2, 143–145, 151, 906; 408/239 R, 239 A, 222, 238, 241 R; 81/119, 121.1, 124.3, 177.5, 177.85, 180.1, 184, 124.4; 10/141 H

[56] References Cited

U.S. PATENT DOCUMENTS

| | | | |
|---|---|---|---|
| 1,478,736 | 12/1923 | Gadberry | 81/124.4 |
| 2,987,334 | 6/1961 | Wendling | 81/177.85 X |
| 3,553,753 | 1/1971 | Hundley | 10/141 H |
| 3,738,768 | 6/1973 | Kuhn | 81/177.5 X |
| 4,095,917 | 6/1978 | Wesner | 408/239 R |
| 4,111,591 | 9/1978 | Rolnick | 408/239 R X |
| 4,770,073 | 9/1988 | Palm | 81/177.85 |

OTHER PUBLICATIONS

Enco "Handtapper", Model 318-0007, shown in catalogue, p. 109.

*Primary Examiner*—Steven C. Bishop
*Attorney, Agent, or Firm*—Allegretti & Witcoff, Ltd.

[57] ABSTRACT

A socket driveable tap apparatus is disclosed. The apparatus has an exterior cylindrical wall, an interior tap wall and a top ridge. The tap wall and top ridge are located at one end of the apparatus and define a tap receiving aperture. The tap receiving aperture is provided with means for securing a tap in the tap receiving aperture. A bottom ridge and a socket drive aperture are located opposite from the top ridge and are constructed and arranged to facilitate receipt of a standard socket drive.

5 Claims, 2 Drawing Sheets

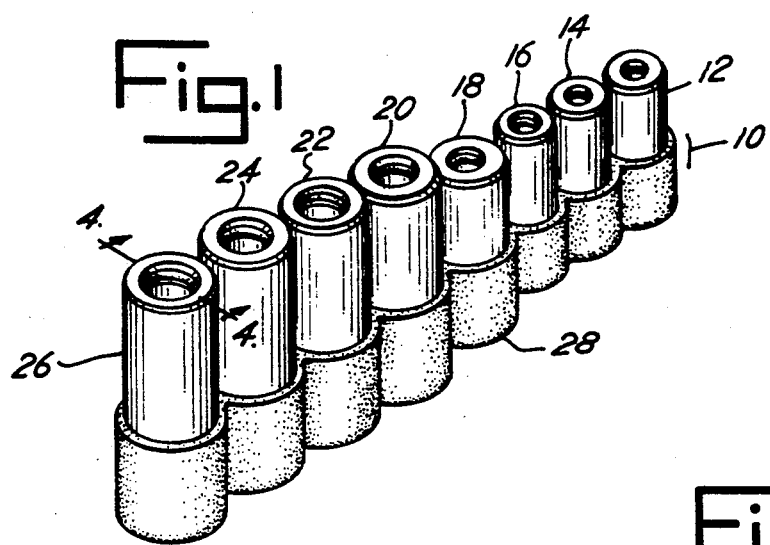
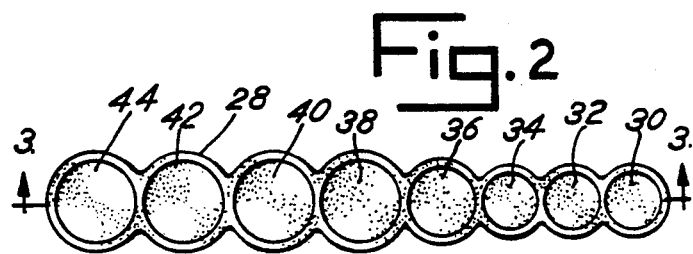
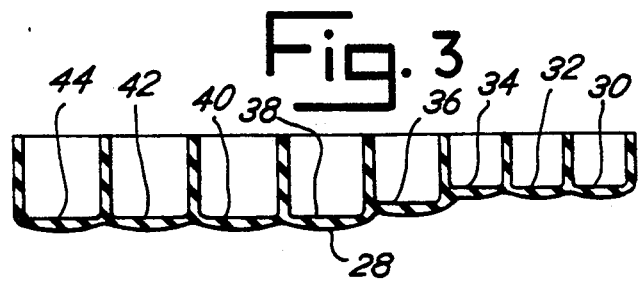
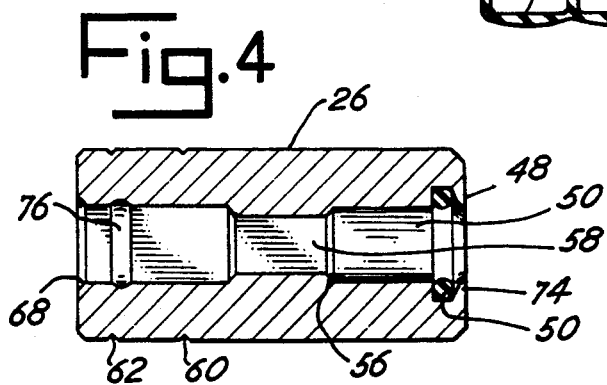
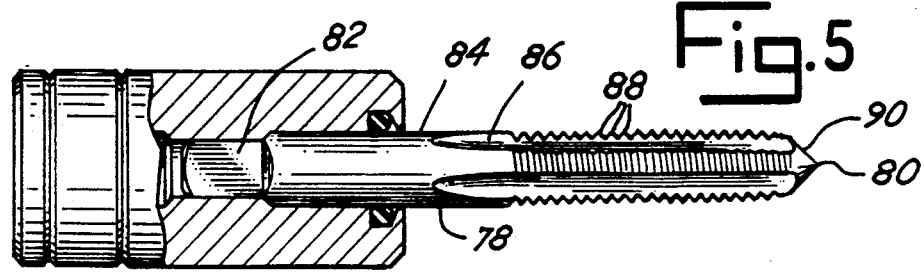

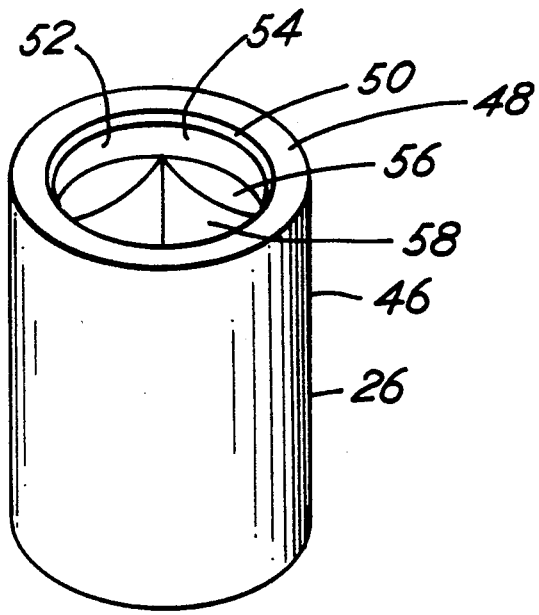
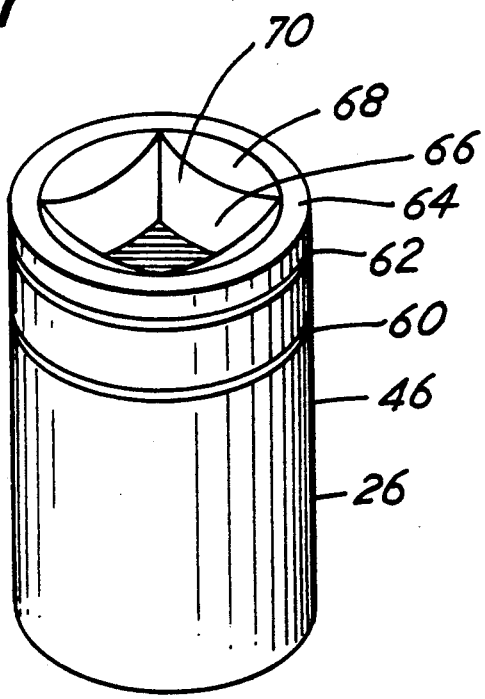

SOCKET DRIVEABLE TAP APPARATUS

BACKGROUND OF THE INVENTION

In a principal aspect, the present invention relates to a socket driveable tap apparatus. Specifically, the invention relates to a socket driveable tap apparatus which is constructed and arranged so that a tap may be driven with a standard socket set.

A particular problem associated with the use of tap equipment is the need for specialized drive means. Specifically, many devices for tapping holes in steel for insertion of screw or bolt means require drive mechanisms that facilitate working in cramped quarters.

Many methods and apparatus designed for driving tap equipment have been made in the past, but none of these has been able to provide an easily used, inexpensive and simple apparatus while at the same time providing the advantages, structure and features of the present invention.

A problem thus associated with apparatus for driving a tap that have been made in the past is that they are often too cumbersome to be effectively use.

Yet another problem associated with apparatus for driving a tap that have been in the past is that their complexity renders it impractical for periodic use, as the inexperienced user is unfamiliar with the proper use of the apparatus.

Yet another problem associated with apparatus for driving a tap that have been made in the past is that they are sufficiently difficult to use so as to dissuade their use at all.

Still a further associated with apparatus for driving a tap, and particularly with socket driveable tap apparatus that have been made in the past, is that they require a great amount of working space, and are thereby prohibitive to use in situations, such as automotive work, that force the user to work in extremely tight spaces.

An even more particular problem associated with socket driveable tap apparatus that had been made in the past is that they fail to secure the tap in the drive apparatus sufficiently. Thus, the tap comes dislodged from the driving apparatus, thereby frustrating effective use thereof.

The present invention constitutes an improved socket driveable tap apparatus that seeks to overcome these problems, while at the same time providing a simple, easily constructed design that is readily adapted to a variety of uses.

SUMMARY OF THE INVENTION

Briefly, the present invention comprises a socket driveable tap apparatus. More specifically, the invention comprises an improved socket driveable tap apparatus having means to secure a tap in the drive means.

Thus, it is an object of the present invention to provide a socket driveable tap apparatus that is compact in both its structure and usage and can be used with a variety of sizes of taps, thereby facilitating the inexpensive manufacture and procurement of such apparatus for the periodic user.

A further object of the present invention is to provide a socket driveable tap apparatus that is simply designed and inexpensive to manufacture, maintain and use.

Yet a further object of the present invention is to provide a socket driveable tap apparatus that can accommodate a wide variety of taps, and thereby permit use in many different situations.

An even further object of the present invention is to provide a socket driveable tap apparatus that has a construction providing for the easy storage thereof, so that the individual components of the apparatus are not lost through periodic use, neglect or accident.

Yet another object of the present invention is to provide a socket driveable tap apparatus that offers a wide range of operability due to its combination of compact size and its ability to accommodate varied taps.

A further object of the present invention is to provide a socket driveable tap apparatus that is easily accessed by the user without an undue expenditure of time searching for the necessary apparatus.

An even further object of the present invention is to provide a socket driveable tap apparatus that is readily useable with little or no training or instruction whatsoever.

An even further object of the present invention is to provide a socket driveable tap apparatus that provides means for adhering the tap in the drive apparatus so that the tap does not become dislodged from the drive apparatus during use thereof.

These and other objects, advantages and features of the present invention will be apparent from the detailed description that follows.

BRIEF DESCRIPTION OF THE DRAWING

In the detailed description that follows, reference will be made to the drawing comprised of the following seven figures.

FIG. 1 is an upper perspective view illustrating a preferred embodiment of the apparatus;

FIG. 2 is a top plan view illustrating a portion of the preferred embodiment of the FIG. 1;

FIG. 3 is a side plan view illustrating a portion of the preferred embodiment of FIG. 2 as seen along the line 3—3;

FIG. 4 is a side plan view illustrating a second preferred embodiment of the apparatus as shown along with line 4—4;

FIG. 5 is a side plan view partial cut away illustrating the preferred embodiment of FIG. 4 as it is used with a tap apparatus.

FIG. 6 is a top plan view of the preferred embodiment shown in FIG. 4; and

FIG. 7 is a bottom plan view of the preferred embodiment shown in FIG. 4.

DETAILED DESCRIPTION OF THE DRAWING

As can be seen in FIG. 1, a socket driveable tap apparatus kit 10 is disclosed. The kit 10 is comprised of a plurality of socket tap drives of differing sizes. As shown, the kit 10 is comprised of eight socket tap drives 12, 14, 16, 18, 20, 22, 24, 26. The eight socket tap drives 12, 14, 16, 18, 20, 22, 24, 26 are held in a socket tap drive kit holder 28, commonly made of a thermoplastic material.

Referring now to FIGS. 2 and 3, the socket tap drive kit holder 28 is provided with eight pockets 30, 32, 34, 36, 38, 40, 42, 44. Thus, the first socket tap drive 12 is held in the first pocket 30, the second socket tap drive 14 is held in the second pocket 32, the third socket tap drive 16 is held in the third pocket 34, the fourth socket tap drive 18 is held in the fourth pocket 36, the fifth socket tap drive 20 is held in the fifth pocket 38, the sixth socket tap 22 is held in the sixth pocket 40, the seventh socket tap drive 24 is held in the seventh pocket 42 and the eight socket tap drive 26 is held in the eighth pocket 44.

Referring now to FIG. 6, the eighth socket tap drive 26 is shown. The socket tap drive 26 has an exterior cylindrical wall 46, at the top of which is a top ridge 48. An O-ring retainer 50 is provided. The tap drive 26 has an interior tap wall 52 which in combination with the inner periphery of the top ridge 48, define a tap receiving aperture 54. At the bottom of the cylindrical shaped tap receiving aperture 54 is a tap shoulder support shelf 56 which defines a tap drive shaft aperture 58 of substantially square cross section.

Referring now to FIG. 7, the bottom half of the tap drive 26 is shown (in upside down relation to FIG. 6). Thus, the tap drive 26 has an upper circumferential groove 60 and a lower circumferential groove 62. The drive 26 is further provided with a bottom ridge 64. A socket drive aperture 66 is constructed and arranged for receipt of a standard socket drive (not shown) and is substantially square in cross section. Disposed about the periphery of the socket drive aperture 66 is a countersink bevel 68 which is constructed and arranged to facilitate easy installation and removal of a socket drive. A socket drive wall 70 is substantially square in cross section and is of a sufficient height to facilitate receipt of the socket drive (not shown).

Referring now to FIG. 4, an O-ring crimp ridge 74 is shown. Thus, during assembly of the socket tap drive apparatus 26, a rubber or rubber-like O-ring 50 is slotted in the O-ring receiving groove 92, and the apparatus 26 is crimped so as to provide the O-ring crimp ridge 74 which holds the O-ring 50 in place. The O-ring 50, the O-ring receiving groove 92 and the ridge 74 thus provide means for securing a tap drive in the tap receiving aperture 54.

Referring now to FIGS. 4 and 5, a socket drive releasing ball groove 76 is provided in the socket drive aperture of the apparatus 26. The socket drive releasing ball groove 76 is constructed and arranged to receive a releasing ball provided on a standard socket drive so as to effect release and engagement of the socket drive from the apparatus 10, thus defining means for securing a socket drive in the socket drive aperture 66.

Referring again now to FIG. 5, a tap 78 is shown. The tap 78 is provided with a tap tip 80, a square drive base 82 and a cylindrical body 84. The tap 78 has a plurality of grooved recesses 86 disposed longitudinally about the axis of the tap 78. Cutting teeth 88 are provided which extend substantially perpendicular to the groove recesses 86 and effect cutting of the metal to be tapped. A conical point 90 of substantially smooth texture is provided at the upper end of the tap 78, terminating in the tap tip 80.

The invention therefore provides an improved socket driveable tap apparatus. The foregoing detailed description describes a preferred embodiment of the invention. It is clear, however, that the preferred embodiment may be variously modified. Therefore, to particularly point out and distinctly claim the subject matter regarded as invention, the following claims conclude this specification.

What is claimed is:

1. A socket driveable tap apparatus comprising, in combination:
   an exterior cylindrical wall, an interior tap wall, and a top ridge, the interior tap wall and top ridge being located at one end of the apparatus and defining a tap receiving aperture;
   a tap shoulder support shelf located in the tap receiving aperture and a tap drive aperture, the tap receiving aperture being of substantially circular cross section and extending into the apparatus from the top ridge to the tap shoulder support shelf;
   the tap drive aperture being of substantially square cross section and extending inward from the tap shoulder support shelf, the tap shoulder support shelf being constructed and arranged to facilitate receipt of a tap;
   means for securing a tap in the tap receiving aperture;
   a bottom ridge and a socket drive wall being located at the opposite end of the apparatus from the top ridge and defining a socket drive aperture, the socket drive aperture being of substantially square cross section and being constructed and arranged to facilitate receipt of a standard socket drive; and
   means for securing a socket drive in the socket drive aperture.

2. A socket driveable tap apparatus as disclosed in claim 1, whereby the means for securing a tap in the tap receiving aperture comprises:
   an O-ring, an O-ring receiving groove and an O-ring crimp ridge;
   the O-ring crimp ridge being adjacent the inner edge of the top ridge, the O-ring receiving groove being disposed about the outer end of the tap receiving aperture, the O-ring being interposed between the O-ring receiving groove and the O-ring crimp ridge, whereby the O-ring is held in place by cooperation of the O-ring receiving groove and the O-ring crimp ridge.

3. A socket driveable tap apparatus kit comprising, in combination:
   a plurality of socket tap drives;
   a socket tap drive kit holder;
   the kit holder having a plurality of pockets, each of said pockets receiving a socket tap drive;
   each of the socket tap drives comprising
   an exterior cylindrical wall, an interior tap wall, and a top ridge, the interior tap wall and top ridge being located at one end of the apparatus and defining a tap receiving aperture;
   a tap shoulder support shelf located in the tap receiving aperture and a tap drive aperture, the tap receiving aperture being of substantially circular cross section and extending into the apparatus from the top ridge to the tap shoulder support shelf;
   the tap drive aperture being of substantially square cross section and extending inward from the tap shoulder support shelf, the tap shoulder support shelf being constructed and arranged to facilitate receipt of a tap;
   an O-ring, an O-ring receiving groove and an O-ring crimp ridge;
   the O-ring crimp ridge being adjacent the inner edge of the top ridge, the O-ring receiving groove being disposed about the outer end of the tap receiving aperture, the O-ring being interposed between the O-ring receiving groove and the O-ring crimp ridge, whereby the O-ring is held in place by cooperation of the O-ring receiving groove and the O-ring crimp ridge;
   a bottom ridge and a socket drive wall being located at the opposite end of the apparatus from the top ridge and defining a socket drive aperture, the socket drive aperture being of substantially square cross section and being constructed and arranged to facilitate receipt of a standard socket drive; and means for securing a socket drive in the socket drive aperture.

4. A socket driveable tap apparatus comprising, in combination:

an exterior cylindrical wall, an interior tap wall, and a top ridge, the interior tap wall and top ridge being located at one end of the apparatus and defining a tap receiving aperture;

a tap shoulder support shelf located in the tap receiving aperture and a tap drive aperture, the tap receiving aperture being of substantially circular cross section and extending into the apparatus from the top ridge to the tap shoulder support shelf;

the tap drive aperture being of substantially square cross section and extending inward from the tap shoulder support shelf, the tap shoulder support shelf being constructed and arranged to facilitate receipt of a tap;

an O-ring, an O-ring receiving groove and an O-ring crimp ridge defining a tap securing assembly;

the O-ring crimp ridge being adjacent the inner edge of the top ridge, the O-ring receiving groove being disposed about the outer end of the tap receiving aperture, the O-ring being interposed between the O-ring receiving groove and the O-ring crimp ridge, whereby the O-ring is held in place by cooperation of the O-ring receiving groove and the O-ring crimp ridge, the tap securing assembly thereby being constructed and arranged to secure a tap in the tap receiving aperture;

a bottom ridge and a socket drive wall being located at the opposite end of the apparatus from the top ridge and defining a socket drive aperture, the socket drive aperture being of substantially square cross section and being constructed and arranged to facilitate receipt of a standard socket drive; and means for securing a socket drive in the socket drive aperture.

5. A socket driveable tap apparatus comprising, in combination:

an exterior cylindrical wall, an interior tap wall, and a top ridge, the interior tap wall and top ridge being located at one end of the apparatus and defining a tap receiving aperture;

a tap shoulder support shelf located in the tap receiving aperture and a tap drive aperture, the tap receiving aperture being of substantially circular cross section and extending into the apparatus from the top ridge to the tap shoulder support shelf;

the tap drive aperture being of substantially square cross section and extending inward from the tap shoulder support shelf, the tap shoulder support shelf being constructed and arranged to facilitate receipt of a tap;

an O-ring, an O-ring receiving groove and an O-ring crimp ridge defining a tap securing assembly;

the O-ring crimp ridge being adjacent the inner edge of the top ridge, the O-ring receiving groove being disposed about the outer end of the tap receiving aperture, the O-ring being interposed between the O-ring receiving groove and the O-ring crimp ridge, whereby the O-ring is held in place by cooperation of the O-ring receiving groove and the O-ring crimp ridge, the tap securing assembly thereby being constructed and arranged to secure a tap in the tap receiving aperture;

a bottom ridge and a socket drive wall being located at the opposite end of the apparatus from the top ridge and defining a socket drive aperture, the socket drive aperture being of substantially square cross section and being constructed and arranged to facilitate receipt of a standard socket drive;

a countersink bevel disposed about the periphery of the socket drive aperture and being constructed and arranged to facilitate easy installation and removal of a socket drive, a socket drive wall substantially square in cross section and being sufficiently high to facilitate receipt of a socket drive, a socket drive releasing ball groove disposed in the socket drive aperture and constructed and arranged to receive a releasing ball provided on a standard socket drive, thereby facilitating release and engagement of the socket drive from the apparatus.

* * * * *